United States Patent Office 3,151,293
Patented Sept. 29, 1964

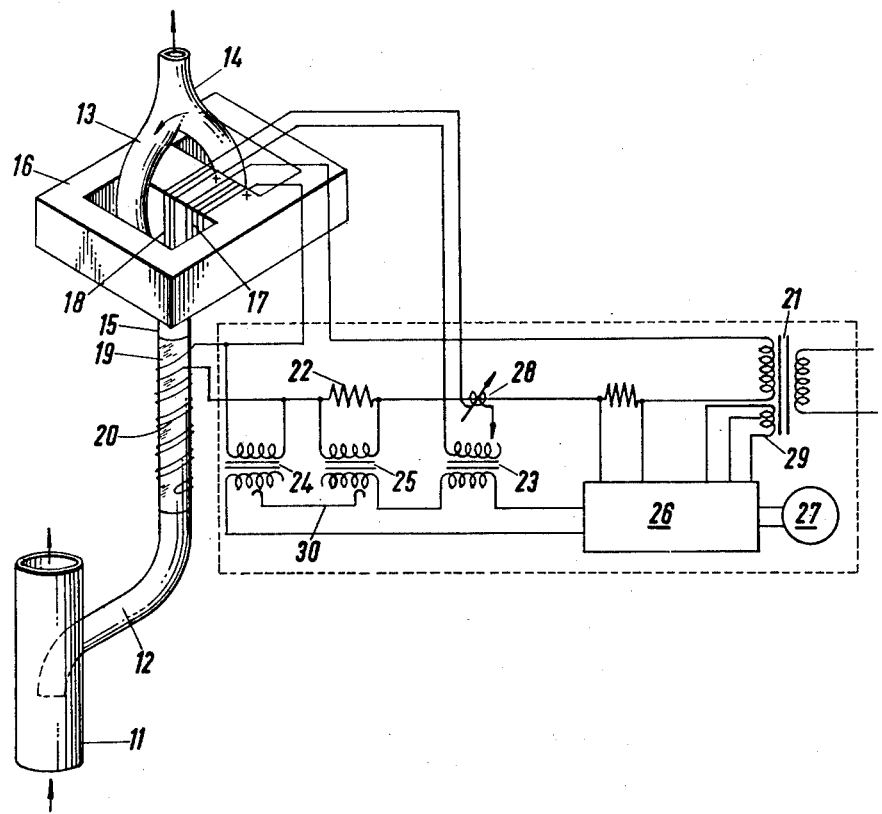

3,151,293
INDUCTION APPARATUS INCLUDING TEMPERATURE RESPONSIVE MEANS FOR MEASURING THE ELECTRICAL RESISTIVITY OF LIQUID METALS
Leslie Reginald Blake, Shepshed, England, and Anthony Rainsford Eames, Thurso, Caithness, Scotland, assignors to United Kingdom Atomic Energy Authority, London, England
Filed Sept. 6, 1961, Ser. No. 136,332
Claims priority, application Great Britain Sept. 6, 1960
4 Claims. (Cl. 324—39)

The low melting point alkali metals, especially sodium, are attractive for use as coolant in nuclear reactors because of their good heat transfer properties. However, a high degree of purity must be maintained, and in particular the oxide content must be kept low. Oxide trapping devices may be included in the flow circuit but nevertheless a check for the presence of oxide is still desirable. The advantage of measuring electrical resistivity over other feasible methods of performing this check is that the resistivity measurement can be made continuously.

In the case of sodium an increase in the oxygen content by one part per million results in the electrical resistivity being increased by about 0.01%. However the temperature coefficient of resistivity is relatively high and the same order of resistivity increase is brought about by a temperature change of 0.04° C. Accurate compensation for changes of temperature is therefore essential. It is with the problem of achieving this accuracy that the invention is mainly concerned.

In co-pending patent application No. 817,875, now U.S. Patent No. 3,078,412 there is described and claimed an apparatus for measuring small changes of electrical resistivity in flowing liquid metals primarily for the purpose of ascertaining the metal oxide content at a particular point in the stream, the fact being now established that the presence of oxide in liquid metal increases the resistivity. Impurities of other kinds have the same effect so that such apparatus may serve also for detecting gas bubbles.

Such apparatus (hereinafter referred to as apparatus of the kind described) comprises means to cause the passage of an alternating current through liquid metal in a pipe, means to derive a test voltage dependent upon the current passing through the liquid metal, and means to compare the test voltage with a reference voltage derived from a standard resistance through which is passed a current related to the current passed through the liquid metal, the standard resistance having the same thermal coefficient of resistivity as the liquid metal and being maintained in thermal contact with the liquid metal.

There is a possibility that a material may be available for the standard resistance which has the same thermal coefficient of resistivity as a particular liquid metal under test, but is is likely that this will be so only within a limited temperature range on account of differing second order terms in the respective coefficients.

Accordingly, the present invention provides apparatus of the kind described wherein the standard resistance comprises a component having a resistance responsive to temperature which is in thermal contact with the liquid metal, a second component having a resistance substantially independent of temperature, and transformer means connecting the two components, the transformer means being adjustable to enable variation of the proportions of the reference voltage obtained from each resistance and thus variation of the overall thermal coefficient of resistivity of the standard resistance.

The use of transformer means enables an adjustment of the thermal coefficient of resistivity of the standard resistance to be made to match liquid metal thermal coefficients of resistivity which are higher as well as lower than that of the thermally responsive component of the standard resistance.

The choice of material for the temperature compensating resistance is important since, as far as possible, this material should meet the following primary requirements, which are now recognized as being significant for high accuracy: high electrical and oxidation resistances, a constant resistivity temperature coefficient closely similar to that of the liquid metal under test, and non-magnetic properties. It is a feature of the invention that platinum wire has been found suitable for meeting these requirements. Such wire is wound non-inductively around, and insulated electrically from, the metal pipework conducting the liquid metal. To compensate for delays in an abrupt change of temperature of the liquid metal being transmitted to the platinum wire, the latter is preferably disposed on a portion of pipe upstream of the loop pipe.

One embodiment of the invention will now be described by way of example with reference to the accompanying drawing which shows a diagrammatic perspective view of the apparatus with its associated electrical circuit.

As illustrated in the drawing, a main pipe 11 for conducting a liquid metal such as sodium has a by-pass sample pipe 12 including a closed loop in the form of a toroid pipe 13 having opposed inlet and outlet connections 14 and 15 respectively. The pipework is of stainless steel and the positioning is such that flow of the liquid metal in the sample pipe is vertically upwards so as to ensure that gas bubbles, oxide and other impurities do not lodge in the toroid pipe.

Linking symmetrically with the toroid pipe 13 intermediate the inlet and outlet connections 14 and 15 is a double-loop magnetic core 16 made up of numetal laminations and thin sheet mica insulation interposed between pairs of laminations. Such insulations may be silicone resin bonded on one face only of each lamination and the laminations assembled back to back in pairs. With mica insulation the core can operate at high temperature without increasing eddy current losses. A single magnetising winding 17 is wound around the common limb of the double-loop core at a position to one side of the toroid pipe and acts as a primary winding so that the metal flowing in the toroid pipe forms the secondary load. Also wound around the common limb of the core and closely proximate to the toroid pipe is a probe coil 18.

A platinum wire is wound non-inductively on a sleeve of mica 19 at a portion of the sample pipe upstream of the toroid, this wire serving as a temperature compensating resistance 20. Although not shown in the drawing this resistance is preferably embedded in magnesium oxide applied as a paste to the mica sleeve and an outer lagging of asbestos tape is then bound tightly around the resistance.

A supply transformer 21 for connection to an alternating current source has its secondary winding connected to supply the magnetising winding 17 through a circuit including the series combination of the temperature compensating resistance 20 and a further resistance 22 which is of a material chosen for its low resistivity temperature coefficient, such as constantan wire or a wire of a nickel copper alloy known as "Manganin," and is situated remote from the pipework for the liquid metal so as to be thermally stable. In the case of constantan wire, its small negative temperature coefficient may be balanced by the addition of a short length of copper wire, for example, which has a positive coefficient.

The probe coil 18 feeds a probe circuit through a voltage transformer 23, and two further voltage transformers 24 and 25 with their secondary windings in this circuit are employed respectively for tapping the voltage drops across the two resistances 20 and 22. The probe circuit is connected to a phase sensitive rectifier 26 which rectifies the alternating current signals in the probe circuit for transmission to a recorder 27. The phase sensitive rectifier derives a bias supply from a winding 29 on the supply transformer 21, this bias supply being rectified for use in bringing the recorder 27 to a centre position for zero signal in the probe circuit. In order to eliminate an unwanted quadrature component arising on account, for example, of leakage reactance between the toroid pipe and the probe coil a variable mutual inductance 28 is included in the primary circuit of the probe coil transformer 23. The tappings on the secondary windings of the transformers 24 and 25 are coupled mechanically as shown at 30 so that the voltage derived from the resistance combination 20, 22 remains unchanged at the operating temperature when an adjustment of these tappings is made, the effect of this adjustment being to vary the relative proportions supplied by the resistances.

Liquid sodium has a resistivity temperature coefficient of 0.0026 per degree centigrade at 200° C. which is greater than the corresponding figure for platinum, namely 0.0021. The connections of the transformers 24 and 25 are therefore so arranged that in effect the voltage from the thermally stable resistance 22 is subtracted from the voltage tapped from the platinum temperature compensating resistance 20 in order that the temperature coefficient of the combination is greater than that of the resistance 20 alone.

In operation, magnetisation of the core 16 by the magnetising winding 17 induces alternating current flow in the liquid metal flowing through the toroid pipe 13 between the inlet and outlet connections 14 and 15. The voltage required to drive this current is measured in proportion to its number of turns by the probe coil 18 and this probe coil voltage is balanced by adjustment of an adjustable tap on the primary winding of the transformer 23 with the voltage derived from the resistance combination 20, 22 to produce a zero reading on the recorder 27. The tapping of the transformer 23 on its primary side may be calibrated directly in terms of electrical resistivity; alternatively the secondary side could be tapped and calibrated directly in terms of conductivity.

The resistivity temperature coefficient represented by the resistance combination can be adjusted as different liquid metals are used. For this purpose the control afforded by the coupled tappings 30 is adjusted until balance is achieved at differing liquid metal temperatures using metal which is pure or of fixed impurity content. Preferably this setting procedure is carried out with the temperature oscillating slowly between the limits of a narrow range.

I claim:
1. Apparatus for measuring small changes of electrical resistivity in a flowing liquid metal comprising a closed loop pipe through which the liquid metal flows, an induction coil to induce an alternating current in the liquid metal in the pipe, a probe coil proximate to the loop pipe to derive a test voltage from the alternating current, a temperature compensating electrical resistance maintained in thermal contact with the liquid metal, a thermally stable electrical resistance, and a transformer coupling between the two resistances to derive a reference voltage due to the passage through the resistances of a current related to the alternating current, the transformer coupling comprising primary windings connected across the two resistances, secondary windings linked electromagnetically with the primary windings and coupled tappings which connect the secondary windings in series and which are adjustable to enable variation of the proportions of the reference voltage obtained from each resistance.

2. In apparatus for measuring small changes of electrical resistivity in flowing liquid metals comprising a pipe, means to cause the passage of an alternating current in liquid metal flowing through the pipe, means to derive a test voltage dependent upon the alternating current, a standard resistance maintained in thermal contact with the liquid metal, means to derive a reference voltage by passing a current related to the alternating current through the standard resistance, and means to compare the test voltage and the reference voltage, the provision of a standard resistance comprising a component having a resistance responsive to temperature which is in thermal contact with the liquid metal, a second component having a resistance substantially independent of temperature, and transformer means connecting the two components, the transformer means comprising primary windings connected across the two components, secondary windings linked electromagnetically with the primary windings and coupled tappings which connect the secondary windings in series and which are adjustable to enable variation of the proportions of the reference voltage obtained from each component and thus variation of the overall thermal coefficient of resistivity of the standard resistance.

3. Apparatus as claimed in claim 2, wherein the component having a resistance responsive to temperature is a platinum wire non-inductively wound around the pipe conducting the liquid metal.

4. Apparatus as claimed in claim 3, wherein the pipe has a loop, alternating current is induced in liquid metal flowing through the loop, and the platinum wire is wound around the pipe upstream of the loop.

References Cited in the file of this patent
UNITED STATES PATENTS

| | | |
|---|---|---|
| 1,379,266 | Keeler | May 24, 1921 |
| 2,383,450 | Coleman | Aug. 28, 1945 |
| 2,396,420 | Hayward et al. | Mar. 12, 1946 |
| 2,709,785 | Fielden | May 31, 1955 |
| 2,985,826 | Fluegel | May 23, 1961 |
| 3,030,573 | Yamashita et al. | Apr. 17, 1962 |

FOREIGN PATENTS

| | | |
|---|---|---|
| 761,903 | Great Britain | Nov. 21, 1956 |